No. 722,303. PATENTED MAR. 10, 1903.
W. J. HUGHES.
ACCOUNT SHEET.
APPLICATION FILED JULY 13, 1901.
NO MODEL.
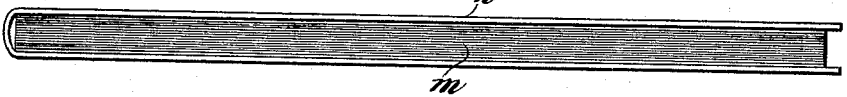

UNITED STATES PATENT OFFICE.

WILL J. HUGHES, OF ST. LOUIS, MISSOURI.

ACCOUNT-SHEET.

SPECIFICATION forming part of Letters Patent No. 722,303, dated March 10, 1903.

Application filed July 13, 1901. Serial No. 68,131. (No model.)

*To all whom it may concern:*

Be it known that I, WILL J. HUGHES, a citizen of the United States, residing at St. Louis, in the State of Missouri, have invented certain new and useful Improvements in Account-Sheets; and I do hereby declare the following to be a full, clear, and exact description of the invention, such as will enable others skilled in the art to which it appertains to make and use the same.

This invention relates to improvements in account sheets or leaves; and the object is to provide a sheet or leaf having a more convenient arrangement of spaces for credit and debit items, balance, amount to be forwarded, &c., than account sheets or leaves now in use, so that the account between the dealer and customer may be more easily and accurately kept and in such simple form as to render it possible to quickly ascertain the condition thereof at any time.

With the above object in view the invention consists in the details hereinafter fully described, particularly pointed out in the claims, and clearly illustrated by the accompanying drawings, in which—

Figure 1 is a view of an account sheet or leaf embodying my invention, and Fig. 2 an edge view of a pad formed of said leaves.

Referring now more particularly to said drawings, A designates the sheet or leaf, having at its upper end a space B, lined to receive the name of the customer, the salesman, and other information and adapted to contain also the name of the dealer. The remainder of said sheet or leaf is divided by a double line $a$ or in any manner into spaces C and D, the lower space C being for credit items and the space D for debit items. Both the debit and credit spaces are divided into central spaces $b$ and $c$ to receive the names of the articles sold and information appertaining to the credits, spaces $d$ and $e$ at the right of the central spaces for dollars and cents, and spaces $f$ and $g$ at the left thereof for the dates, all of said spaces being divided by parallel transversely-extending lines $a'$. At the head of the dollars and cents spaces of the debit portion of the sheet is a space $h$ for the amount brought forward, and to indicate this the words "Amount brought forward" are printed upon the first line of the central space $b$ of said debit portion. At the bottom of the dollars and cents spaces of the debit portion is a space $i$, which is a casting-up or totaling space for said debit part of the account.

Beneath the dollars and cents spaces of the credit portion of the sheet a space $j$ is provided for the balance, which is the amount to be forwarded, and this is indicated by the words "Balance. Amount to forward." At the left of the central space $c$ the credit portion is divided by vertical lines $k$ into spaces $l$, which are dollars and cents spaces for the credit portion, the spaces $e$ being for the total credits, which are thus placed in a column beneath the total debits.

From the above description it will be seen that instead of arranging the sheet with the credit and debit spaces parallel at the right side of the page I have reserved the upper portion of the sheet for debit items and the lower portion for credit items and also so arranged the same that the value of the individual credit items appears at the left of the page, while allowing the balance to be readily shown and constituting a very convenient account sheet or leaf.

The sheets or leaves arranged as above set forth may be blocked in pads $m$, having a semiflexible cover $n$, as illustrated by Fig. 2.

Having thus fully described my invention, what I claim as new, and desire to secure by Letters Patent of the United States, is—

1. An account sheet or leaf having a debit-column in the right-hand portion of said page, a credit-column in the lower left-hand portion of said page, said last-named column being appropriately headed, a space beneath the debit-column for total amount debited and a place beneath the total debit-space for the entry of the total credits, substantially as described.

2. In an account-sheet, the combination of a debit-column in the right-hand portion of said page, a credit-column in the lower left-hand corner of said page, said last-named column being appropriately headed, and a totals-column underneath said debit-column and horizontally opposite said credit-column, substantially as described.

3. An account sheet or leaf having a debit-column in the right-hand portion of said page, a credit-column in the lower left-hand portion of said page, said credit-column being appropriately headed, a line of demarcation between a space in the upper part of said page including said debit-column and the space for the entry of credit items including said credit-column, and a place beneath the debit-column for the entry of the total credits, substantially as described.

4. An account sheet or leaf having its upper portion provided with a debit-space and a debit-column, and said debit-column being arranged at the right-hand portion of the debit-space, a credit-space in the lower portion of the page and underneath said debit-space, an appropriately-headed credit-column in the lower left-hand corner of the page, a line of demarcation between said debit-space and said credit-space, a place beneath the debits-column for the entry of the total debits, and a place beneath the total debits for the entry of the total credits, substantially as described.

In testimony whereof I have hereunto set my hand and affixed my seal this 9th day of July, A. D. 1901.

WILL J. HUGHES. [L. S.]

Witnesses:
 W. A. DELANEY,
 H. A. LOWRY.